United States Patent
Stathacopoulos et al.

(10) Patent No.: US 10,506,279 B2
(45) Date of Patent: Dec. 10, 2019

(54) SYSTEMS AND METHODS FOR PROVIDING A SEQUENCE OF VIDEO-CLIPS IN A PICTURE-IN-GUIDE

(71) Applicant: United Video Properties, Inc., Santa Clara, CA (US)

(72) Inventors: Paul Stathacopoulos, San Carlos, CA (US); Michael R. Nichols, La Canada Flintridge, CA (US)

(73) Assignee: Rovi Guides, Inc., San Jose, CA (US)

( * ) Notice: Subject to any disclaimer, the term of this patent is extended or adjusted under 35 U.S.C. 154(b) by 199 days.

(21) Appl. No.: 14/227,772

(22) Filed: Mar. 27, 2014

(65) Prior Publication Data

US 2015/0281764 A1    Oct. 1, 2015

(51) Int. Cl.
| | | |
|---|---|---|
| *H04N 21/431* | (2011.01) | |
| *H04N 21/482* | (2011.01) | |
| *H04N 21/8549* | (2011.01) | |
| *H04N 21/462* | (2011.01) | |

(52) U.S. Cl.
CPC ..... *H04N 21/4316* (2013.01); *H04N 21/4314* (2013.01); *H04N 21/4622* (2013.01); *H04N 21/482* (2013.01); *H04N 21/4821* (2013.01); *H04N 21/8549* (2013.01)

(58) Field of Classification Search
CPC ............. H04N 21/4316; H04N 21/482; H04N 21/4314; H04N 21/4622; H04N 21/4821
USPC .................................................. 715/716, 723
See application file for complete search history.

(56) References Cited

U.S. PATENT DOCUMENTS

| | | |
|---|---|---|
| 4,071,697 A | 1/1978 | Bushnell et al. |
| 5,353,121 A | 10/1994 | Young et al. |
| 5,410,344 A | 4/1995 | Graves et al. |
| 5,412,720 A | 5/1995 | Hoarty |
| 5,557,338 A | 9/1996 | Maze et al. |
| 5,600,364 A | 2/1997 | Hendricks et al. |
| 5,629,733 A | 5/1997 | Youman et al. |
| 5,678,170 A | 10/1997 | Grube et al. |
| 5,801,787 A | 9/1998 | Schein et al. |
| 5,812,931 A | 9/1998 | Yuen |
| 5,940,073 A | 8/1999 | Klosterman et al. |
| 6,128,009 A | 10/2000 | Ohkura et al. |
| 6,177,931 B1 | 1/2001 | Alexander et al. |

(Continued)

FOREIGN PATENT DOCUMENTS

| | | |
|---|---|---|
| CA | 2773693 | 4/2002 |
| JP | 2000020536 | 1/2000 |

(Continued)

OTHER PUBLICATIONS

NDS Opens a New York Office to Focus on Developing Interactive TV Systems and Application for US Market, Business Wire, pp. 1-3 (Jan. 24, 2001).

(Continued)

*Primary Examiner* — Christopher J Fibbi
(74) *Attorney, Agent, or Firm* — Haley Guiliano LLP

(57) ABSTRACT

Systems and methods for providing a sequence of video clips are provided. A user input identifying a source of video is received. Responsive to the user input, a plurality of future videos provided by the source that is unavailable to the user at a time when the user input was received is identified. A sequence of video clips associated with the identified plurality of future videos is generated.

20 Claims, 6 Drawing Sheets

(56) References Cited

U.S. PATENT DOCUMENTS

| | | | |
|---|---|---|---|
| 6,308,328 B1 | 10/2001 | Bowcutt et al. | |
| 6,331,877 B1 | 12/2001 | Bennington et al. | |
| 6,388,714 B1 | 5/2002 | Schein et al. | |
| 6,539,548 B1 | 3/2003 | Hendricks et al. | |
| 6,668,377 B1 * | 12/2003 | Dunn | H04N 7/17318 |
| | | | 348/E7.071 |
| 6,721,956 B2 | 4/2004 | Wasilewski | |
| 6,810,526 B1 | 10/2004 | Menard et al. | |
| 6,865,746 B1 | 3/2005 | Herrington et al. | |
| 6,898,762 B2 | 5/2005 | Ellis et al. | |
| 7,136,829 B2 | 11/2006 | Hellal et al. | |
| 7,290,285 B2 | 10/2007 | McCurdy et al. | |
| 7,650,621 B2 | 1/2010 | Thomas et al. | |
| 8,255,953 B1 * | 8/2012 | Rowson | H04N 21/4147 |
| | | | 725/39 |
| 2002/0035697 A1 | 3/2002 | McCurdy et al. | |
| 2002/0120507 A1 | 8/2002 | Chanos et al. | |
| 2002/0124247 A1 | 9/2002 | Houghton | |
| 2002/0174430 A1 | 11/2002 | Ellis et al. | |
| 2003/0005445 A1 | 1/2003 | Schein et al. | |
| 2003/0154478 A1 | 8/2003 | Hassell et al. | |
| 2003/0172005 A1 | 9/2003 | Hellal et al. | |
| 2003/0177497 A1 | 9/2003 | Macrae et al. | |
| 2003/0182658 A1 | 9/2003 | Alexander | |
| 2004/0025180 A1 | 2/2004 | Begeja et al. | |
| 2004/0034873 A1 | 2/2004 | Zenoni | |
| 2004/0096184 A1 | 5/2004 | Poslinski | |
| 2004/0133923 A1 | 7/2004 | Watson et al. | |
| 2004/0139047 A1 | 7/2004 | Rechsteiner et al. | |
| 2004/0230992 A1 * | 11/2004 | Yuen | G11B 15/023 |
| | | | 725/43 |
| 2004/0268386 A1 | 12/2004 | Logan et al. | |
| 2005/0015405 A1 | 1/2005 | Plastina et al. | |
| 2005/0028208 A1 | 2/2005 | Ellis et al. | |
| 2005/0028218 A1 | 2/2005 | Blake | |
| 2005/0251827 A1 | 11/2005 | Ellis et al. | |
| 2005/0251832 A1 | 11/2005 | Chiueh | |
| 2005/0278768 A1 | 12/2005 | Boyer et al. | |
| 2006/0271980 A1 | 11/2006 | Mankovitz | |
| 2007/0162502 A1 | 7/2007 | Thomas et al. | |
| 2008/0127262 A1 * | 5/2008 | Neufeld | H04N 21/4821 |
| | | | 725/40 |
| 2008/0276275 A1 | 11/2008 | Ellis | |
| 2010/0107194 A1 | 4/2010 | McKissick et al. | |
| 2010/0186038 A1 | 7/2010 | Thomas et al. | |
| 2012/0141095 A1 * | 6/2012 | Schwesinger | H04N 21/431 |
| | | | 386/290 |
| 2014/0282730 A1 * | 9/2014 | Hieb | H04N 21/482 |
| | | | 725/41 |

FOREIGN PATENT DOCUMENTS

| | | |
|---|---|---|
| JP | 2002014996 | 1/2002 |
| JP | 2002358328 | 12/2002 |
| JP | 2004318389 | 11/2004 |
| WO | WO-01/01677 | 1/2001 |
| WO | WO-01/35662 | 5/2001 |

OTHER PUBLICATIONS

Hogan, "ShopNBC Winks at ITV," Multichannel News, pp. 1-2 (Jun. 25, 2001).

Shaw The Interactive Living Revolution, Multichannel News, pp. 1-3 (Mar. 31, 2003).

Waltner, "Cable Nets Eye New Interactive Services (Interative Television)," Multichannel News, pp. 3-5 (Feb. 22, 1998).

TiVo Viewer's Guide: How to Activate and Use Your TiVo Service, SDOC-0057-000 Rev. B, 2002.

Susanne Boll, et al., "Meeting experience: MediÆther—An event space for Contextware Multimedia Experiences", Proceedings of the 2003 ACM SIGMM Workshop on Experimental Telepresence ETP '03, [Online} Nov. 7, 2003 (Nov. 7, 2003), pp. 21-30, XP002434278 Berkeley, California ISNB: 1-58113-775-3 Retrieved from the Internet: URL : http://deliver_y.acm.orgll 0. 1145/990000/982488/p21-bol 1 . pdf?key1=982488&key2=9969139711&col 1=portal &d1=ACM&CFID=2181828&CFTOKEN=68 827537 > [retrieved on May 16, 2007].

* cited by examiner

600

| Asset ID | Clip ID | Asset Title | Clip Attribute | Length |
|---|---|---|---|---|
| 13597 | 135976 | King of the Hill | Drama | 0:10 |
| 13597 | 135979 | King of the Hill | Comedy | 0:12 |
| 37872 | 378721 | Joe Millionaire | Sit-com | 0:5 |
| 37872 | 378723 | Joe Millionaire | Genre | 0:8 |
| 49999 | 49991 | FOX | Network | 0:3 |

| Source ID | Sequence |
|---|---|
| 7000, FOX | Clip ID #'s 378723, 45555 |
| 80000, HIST | Clip ID #'s 135976, 49991, 135979 |
| ⋮ | ⋮ |

FIG. 7

SYSTEMS AND METHODS FOR PROVIDING A SEQUENCE OF VIDEO-CLIPS IN A PICTURE-IN-GUIDE

BACKGROUND

Media guidance applications, such as interactive television program guides for example, are well known. One typical display arrangement in such applications is a "picture-in-guide" or "PIG" for short. A picture-in-guide is a video window of a currently-airing program within a display of guidance information. A typical format displays video in one quarter of the display, and guidance information in three quarters of the display.

SUMMARY

This disclosure relates to systems and methods for providing a sequence of video clips in the picture-in-guide window of a media guidance application. Responsive to a user input identifying a source of video, such as a television channel, the media guidance application identifies future videos (that is, videos unavailable to the user at the time of the user input) provided by the source and generates a sequence of video clips associated with the videos. For example, a user may navigate to a channel identifier in a program guide grid of a guidance application for a linear television system. In response, the guidance application identifies videos scheduled for transmission during future time slots on that channel and retrieves a video clip associated with each video. The guidance application generates an ordered sequence of the video clips in the order of the future transmissions of their corresponding videos and displays the clips sequentially in the order.

Other user inputs may, alternatively or additionally to the selection of a channel identifier, invoke the sequence of clips in the PIG display by the media guidance application. For example, a selectable element on a user input interface may invoke the sequence. This may be a dedicated button on a remote control, or a selectable element on touch-screen such as on a touch-screen remote or second-screen device. As another example, a dual-purposed input may be used, such as a play button. Once the sequence has started, the guidance application may allow the user to manipulate the sequence such as by starting the next clip, or adding clips to the sequence. The guidance application may allow the user to toggle between live programming and the videos in the window, or between full screen and PIG views. The guidance application may receive user input selecting a given clip that is being presented. In response to receiving the user selection of the clip, the guidance application may perform a media guide function for the video corresponding to the clip. For example, the guidance application may schedule a recording, tune to the video or channel corresponding to the clip, schedule a reminder, etc., for the video corresponding to the clip.

The clips of the sequence may specifically promote a particular video, such as a specific episode of a series, or a movie. Other types of clips may also be included in the sequence. For example, generic clips may be included that promote an entire series. Service-generic clips that promote a video source (e.g., a service), or a particular genre may be included. These may be "bumpers", or animated graphics that have a short duration but that may be repeated in a cycle if desired. Bumpers may also be used to promote the service provider. Interstitial shorts, such as "behind the scenes" type videos, may be included.

The sequence of videos may be customized to the user in content and/or duration. A database of clips accessible to the guidance application may include multiple clips for a video. When the guidance application generates a sequence of the clips, particular clips for the unavailable video may be selected based on a determined or user-specified interest (e.g., based on a user profile). For example, a user profile may indicate a user enjoys comedies, or the user may have specified as a filter for the PIG sequence that the user prefers comedy clips to other types of clips. When generating the sequence, the guide will examine descriptive data, such as metadata, associated with the various clips for the video and select a clip based on whether it is indicated as comedic or not. For example, the video may be a movie characterized in the guidance data as an "action-thriller", but the guidance application will choose the clip that includes comedic segments of that action-thriller.

The duration of the sequence may be customized to the user based on, for example, a user-specified duration. The guidance application may select the clips of various assets that, in total, will approximate closest to the user's specified duration. This may only be used by the guidance application as a threshold and the application may either shorten or lengthen the duration to account for possible variability in clip length, specifically for example to accommodate odd length pieces.

DESCRIPTION OF DRAWINGS

The above and other objects and advantages of the invention will be apparent upon consideration of the following detailed description, taken in conjunction with the accompanying drawings, in which like reference characters refer to like parts throughout, and in which:

FIG. 6 shows an illustrative index of video clips in accordance with some other embodiments of the disclosure;

FIG. 7 shows an illustrative data structure for a video clip sequence in accordance with some other embodiments of the disclosure.

DETAILED DESCRIPTION

Figure 1:
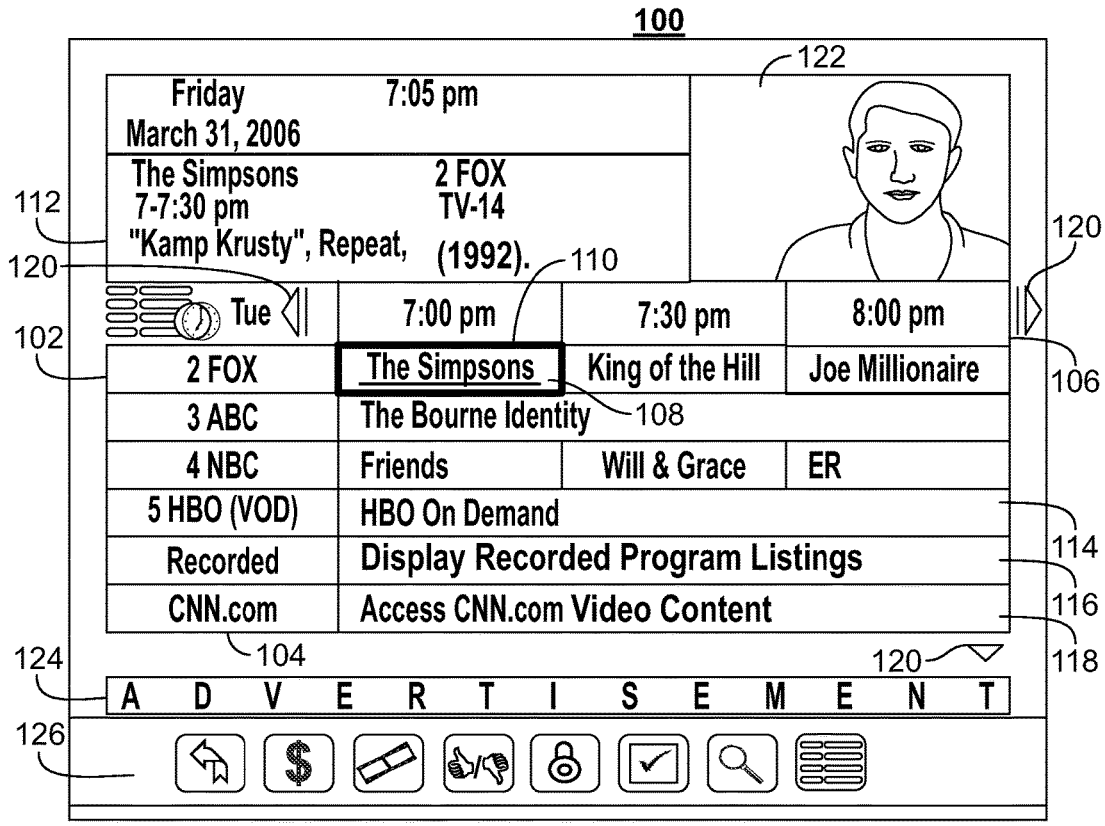
FIGS. 1 and 2 show illustrative display screens that may be used to provide interactive media guidance application listings in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, web sites/web pages, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean data used in operating the guidance application, such as program information, guidance application settings, user preferences or user profile information, video clips, data related to content, such as media listings, media-related information (e.g., broadcast times, broadcast channels, titles, descriptions), ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, web sites, and any other type of guidance data that is helpful for a user to navigate among and locate desired content selections. Media guidance data may also include video clips that are associated with content, content sources, or service providers, and included in sequences for display in a picture-in-guide or "PIG" window.

As referred to herein, the term "clip" means a segment or portion of (or associated with) a media asset. For example, a one-hour-long media asset (e.g., Seinfeld) may be associated with a 30-second clip of the content in the media asset. The clip may include the actual content of some portion of the media asset or may include promotional material that describes, promotes or advertises the media asset.

Figure 2:
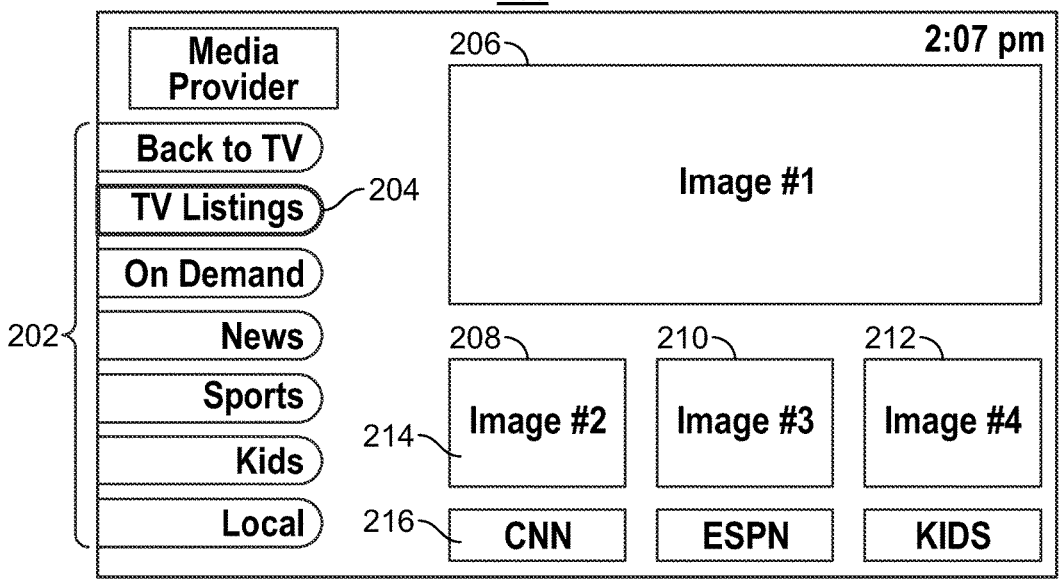
Figure 5:
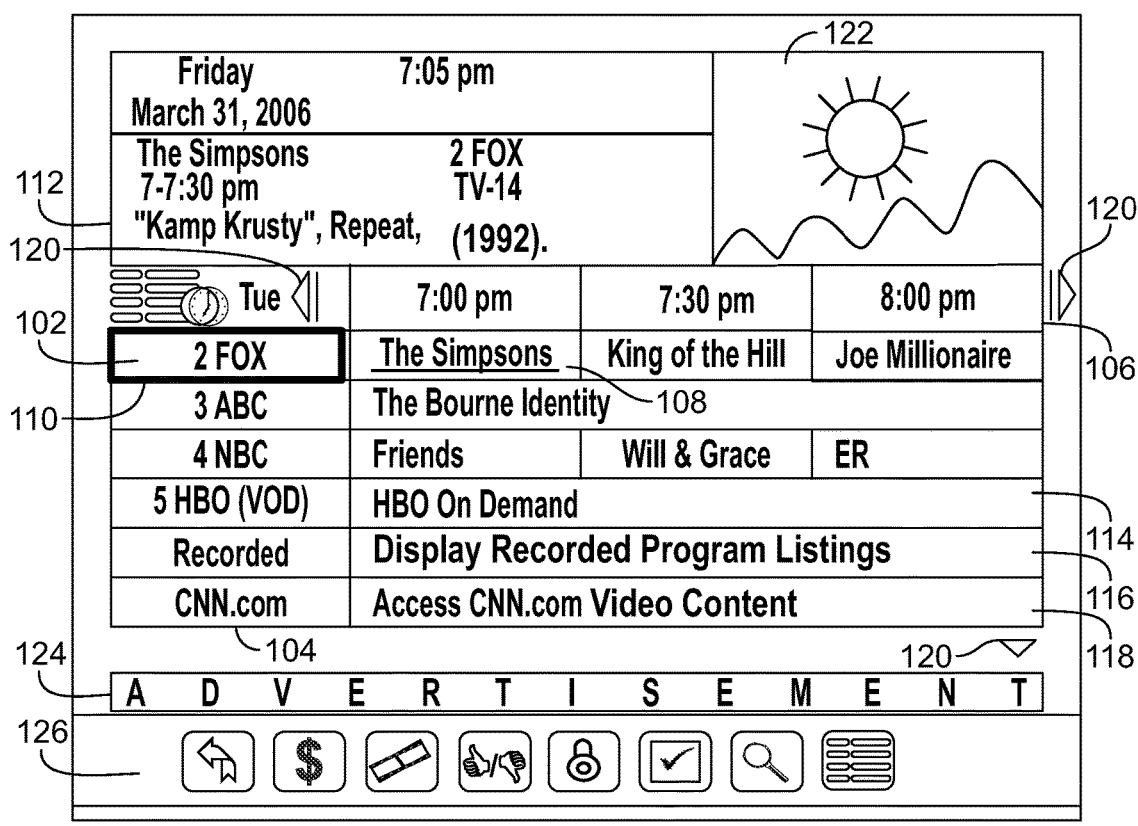
FIG. 5 shows an illustrative display screen that may be used to provide a sequence of video clips in the picture-in-guide window of a media guidance application in accordance with some other embodiments of the disclosure.

FIGS. 1-2 show illustrative display screens that may be used to provide media guidance data. The display screens shown in FIGS. 1-2, and 5 may be implemented on any suitable user equipment device or platform. While the displays of FIGS. 1-2, and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to, or alternative to, providing access to linear programming (e.g., content that is scheduled to be transmitted to a plurality of user equipment devices at a predetermined time and is provided according to a schedule), the media guidance application also provides access to non-linear assets (e.g., content accessible to a user equipment device at any time and is not provided according to a schedule). Non-linear assets may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear assets including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include picture-in-guide (PIG) video region 122, advertisement 124, and options region 126. Video region 122 may allow the user to view and/or preview programs or clips that are currently available, will be available, or were available to the user. The content of PIG video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

PIG video region 122 may include video of a currently available program, such as the program that the user's equipment was tuned to upon entering the guide, or a current program that is selected by the user while navigating within grid 102. In response to a suitable input as discussed below, the guidance application may display in PIG video region 122 a sequence of video clips including video clips associated with currently unavailable programs (such as broadcast programs of a future time slot). The sequence may be generated by the media guidance application according to the process described in connection with FIG. 8.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to set up video clip sequences displayed in PIG video window 122, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations. In particular, the sequence of video clips displayed in PIG window 122, and/or the duration of the sequence, and/or duration of the clips within the sequence, may be customized based on the user's preference as reflected in the user's profile.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety. Alternatively, listing 206 may instead be a PIG video window that includes a sequence of videos as described herein. For simplicity, the various embodiments of video clip sequences described below will focus on FIG. 1, but this is merely by way of illustration. The various features of the PIG window described herein may be provided in a mosaic, such as that of FIG. 2.

Figure 3:
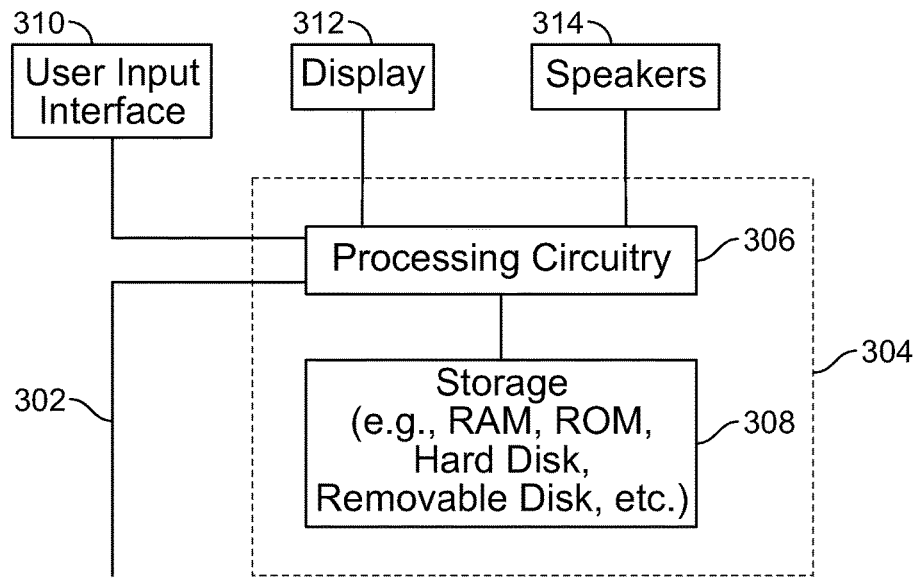
FIG. 3 shows an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In particular, control circuitry 304 may generate for display a PIG window including a currently available program, or a sequence of videos associated with currently unavailable programs as described herein. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below). In some embodiments, control circuitry 304 may communicate with a remote server to obtain video clips for a locally generated sequence. In other embodiments, the sequence may be generated by the remote server.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above (which may include, for example, the video clips for sequences displayed in a PIG window such as PIG video region 122 of FIG. 1). Nonvolatile memory may also be used (e.g., to launch a boot-up routine and other instructions). Cloud-based storage, described in relation to FIG. 4, may be used to supplement storage 308, or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits for providing content and guidance application displays, and in particular guidance application displays having a PIG window with sequences of clips associated with unavailable videos. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
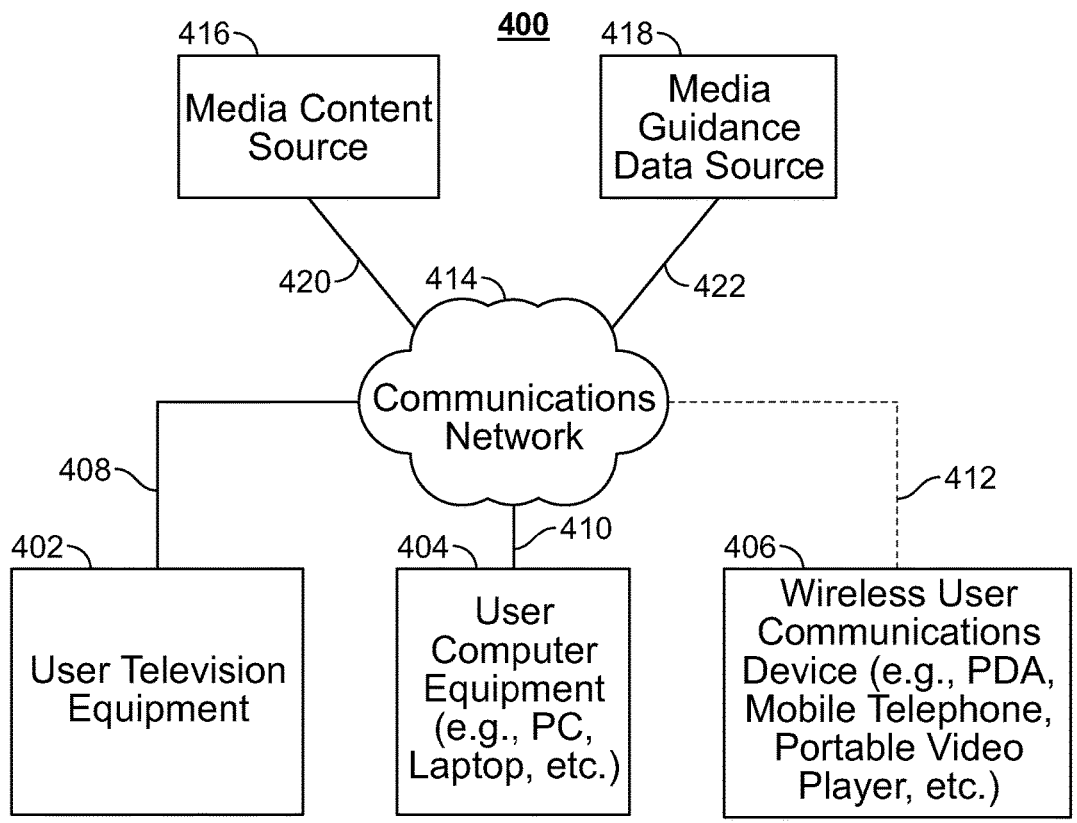
FIG. 4 is a diagram of an illustrative cross-platform interactive media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device, such as an interface for allowing a user to manipulate the display of video sequences shown in a PIG window, such as PIG video region 122 of FIG. 1. In some embodiments, the second screen device is configured for interacting with other second screen devices or for interacting with a social network. The second screen device can be located in the same room as the first device, a different room from the first device but in the same house or building, or in a different building from the first device. In some implementations, the sequence of video clips may be provided to the user on the second screen device instead of (or in addition to) being provided on display 312 (e.g., in video region 122).

The user may also set various settings to maintain consistent media guidance application settings across in-home devices and remote devices. Settings include those described herein, as well as channel and program favorites, programming preferences that the guidance application utilizes to make programming recommendations, display preferences, PIG video sequence preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, PIG video sequence settings, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Returning briefly to FIG. 1, PIG window 122 displays a video of a currently available program, in this example the program currently highlighted by highlight 108. The media guidance application will replace the video with a sequence of video clips for unavailable assets responsive to a suitable user input. This input may be, for example, the user navigating the highlight region 100 to one of the source indicators 104 as shown in FIG. 5, or to a later listing (not shown) (e.g., a listing for a media asset scheduled for transmission in a future time interval). Another illustrative user input received by the guidance application is one associated with a designated element on user input interface 310 (FIG. 3), such as a dedicated element on a remote control, or a purposed element on a touch screen, which in the programming logic of the guide invokes the sequence of clips for a source identified by the input.

Although the presentation of the sequence of video clips is discussed in the context of a selection of a listing for a future media asset (or unavailable videos), the sequence may be presented similarly in response to the user identifying any other listing. For example, the sequence may correspond to currently available and/or currently unavailable videos or media assets.

In some implementations, the media guidance application may receive a user request for a list of recommended media assets. In response, the media guidance application may retrieve a predetermined number of media asset clips corresponding to media assets that match a user profile. The clips may be arranged in a sequence (as discussed above and below) and presented to the user in PIG window 122 or in any other manner. The sequence of the media asset clips in this circumstance may be based on how relevant the media asset clips are to the user and/or recommendation (e.g., more relevant media asset clips (clips that are more strongly recommended) may be presented earlier in the sequence than less relevant media asset clips).

In some implementations, the media guidance application may receive a user request for media asset matching a user defined search expression. In response, the media guidance application may retrieve a predetermined number of media asset clips corresponding to media assets that match the search expression. The clips may be arranged in a sequence (as discussed above and below) and presented to the user in PIG window 122 or in any other manner. The sequence of the media asset clips in this circumstance may be based on how relevant the media asset clips are to the user and/or search expression (e.g., more relevant media asset clips may be presented earlier in the sequence than less relevant media asset clips).

In response to a suitable input, the guidance application will begin automatically generating a display of the sequence of video clips associated with currently unavailable videos for that source identified by the user. In this example, the sequence will begin with a video clip of the "King of the Hill," and when the clip is finished display a video clip associated with "Joe Millionaire". Depending on the duration of the sequence, the guide may also include a clip associated with the video scheduled for the 8:30 pm time slot, and clips associated with videos at later slots.

In some embodiments, the number of clips that are included in the sequence may be based on several factors. These factors may include a user profile, number of available clips, and a threshold time interval. For example, a threshold time interval or threshold time may define a maximum interval or period from the current time for which future videos are identified. In particular, the threshold time may be three hours. In this case, the media guidance application will retrieve clips of videos that are scheduled for transmission from the current time only through a time that is three hours later. For example, if the current time is 7:05 pm, the media guidance application will search for clips of videos that are scheduled for transmission between 7:05 pm and 10:05 pm (i.e., in the case the threshold is three hours). Clips of videos that are scheduled for transmission during a time interval that follows the threshold period or threshold time may be excluded from the sequence.

The sequence of video clips may be interactive, that is, modifiable by the user during the sequence. For example, the user may provide an input in response to which the guide will index forward or backward to the start of the next or a prior video clip. The guide may respond to, for example, the press of a purposed key on the user input interface 310 (FIG. 3), such as a fast-forward or rewind key. In the example of FIG. 5, visual transport bar 150 indicates the current position in the segment, and allows the user to position the play sequence within the segment, for example by pressing and holding a fast-forward key to move the position indicator 152 forward, or pressing and holding a rewind key to move it backward, thereby repositioning the play position of the video clips.

The media guidance application may monitor for user inputs that occur while the sequence of clips is being presented in order to perform a media guidance function for one of the corresponding videos for which the clip is being presented. Specifically, in response to a suitable input from the user (e.g., a record command), the media guidance application may identify the clip being presented at the time the input was received. The media guidance application may determine which video is associated with the clip that was presented and perform a media guidance function for the corresponding video (e.g., schedule the corresponding video for recording).

The media guidance application may also be responsive to further inputs for modifying the PIG display. It may toggle between video of a current program and the sequence of video clips, such as in response to the user navigating back and forth between a listing for a current program, and a source indicator 104. The media guidance application may also toggle between a full-screen display and a PIG display responsive to a suitable user input, such as the user pressing a "GUIDE" key on a remote control while the sequence of video clips is playing.

FIG. 6 shows an illustrative index of video clips. In stand-alone embodiments, the video clips may be provided by media guidance data source 418 (FIG. 4) to a media guidance application running on control circuitry 304 (FIG. 3). Control circuitry 304, under the executable programming logic of the guidance applications, stores the video clips on storage 308. The index 600 of FIG. 6 may be generated by the media guidance application from media guidance data, or may be received from the media guidance data source. Control circuitry 304 generates a sequence using index 600, and retrieves video clips according to the index 600 for playback. As referred to herein, the term "video" is used interchangeably with the terms "media asset" and "program" and should all be understood to have the same meaning as media asset.

Index 600 may include a number of fields for identifying clips and associated assets. In the illustrative example of FIG. 6, asset ID field 602 is a unique ID associated with a video. Clip ID field 604 includes a unique ID associated with a video clip. Asset title field 606 includes the title of the associated asset (of a unique episode or of a series). For some clips, asset title field 606 may include an identifier of an associated entity, such as a network (e.g., FOX) or service provider. Clip attributes field 608 includes one or more attributes characterizing a clip. For example, it identifies a clip's genre (e.g., "drama"), or whether the clip is for a series (e.g., "generic"), or a network. Length field 610 indicates the length, in minutes:seconds format, of the clip.

In some embodiments, as the user navigates through the grid causing new media asset listings and/or content sources to be displayed, the media guidance application may generate video clip sequences for each of the sources in the display. Pre-generating the video clip sequences before the user instructs the media guidance application to present a given clip sequence may expedite the presentation process. The media guidance application may generate the clip sequences according to the process described below in connection with FIG. 8 and may store the different sequences in data structure 700 (FIG. 7). Specifically, data structure 700 may specify the clip sequences for each source 104 that is or is not displayed.

FIG. 7 shows an illustrative data structure 700 for video clip sequence generated and stored by the media guidance application (i.e., control circuitry 304 (FIG. 3) under the control of the executable instructions of the guidance application and stored in storage 308 (FIG. 3)). This example is a two-dimensional array, but any suitable data structure may be used. One array of data structure 700 includes sources and another array includes the clip identifiers of the corresponding sequence of clips for that source. For example, for a given source corresponding to identifier 7000, the media guidance application may generate and store the sequence of clips corresponding to clip numbers 378723 and 45555. The clip numbers enable the media guidance application to retrieve the corresponding clip content by cross-referencing the clip identifier with index 600 (FIG. 6). In particular, when the user requests a clip sequence for the source FOX corresponding to source identifier 7000, the media guidance application may cross-reference data structure 700 to identify the clips in the sequence. In this case, the media guidance application may determine that clip numbers 378723 and 45555 are in the clip sequence. Accordingly, the media guidance application may cross-reference index 600 to retrieve the clips corresponding to clip numbers 378723 and 45555 and present the clips to the user (e.g., first presenting clip corresponding to first identifier 378723 followed by the clip corresponding to second identifier 45555).

Figure 8:
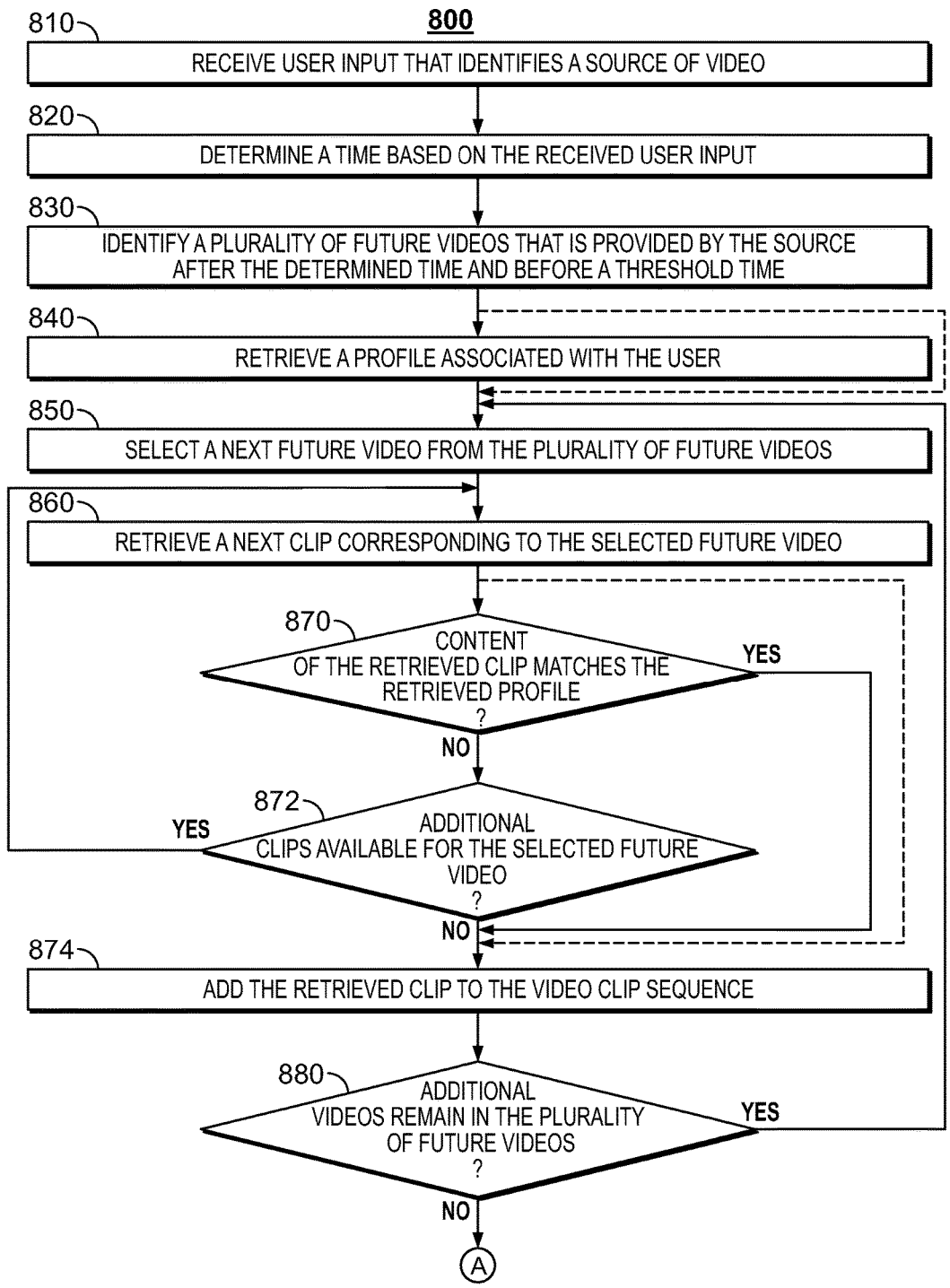
FIG. 8 is a flow diagram for providing a sequence of video clips in the picture-in-guide window of a media guidance application in accordance with some other embodiments of the disclosure.
Figure 8:
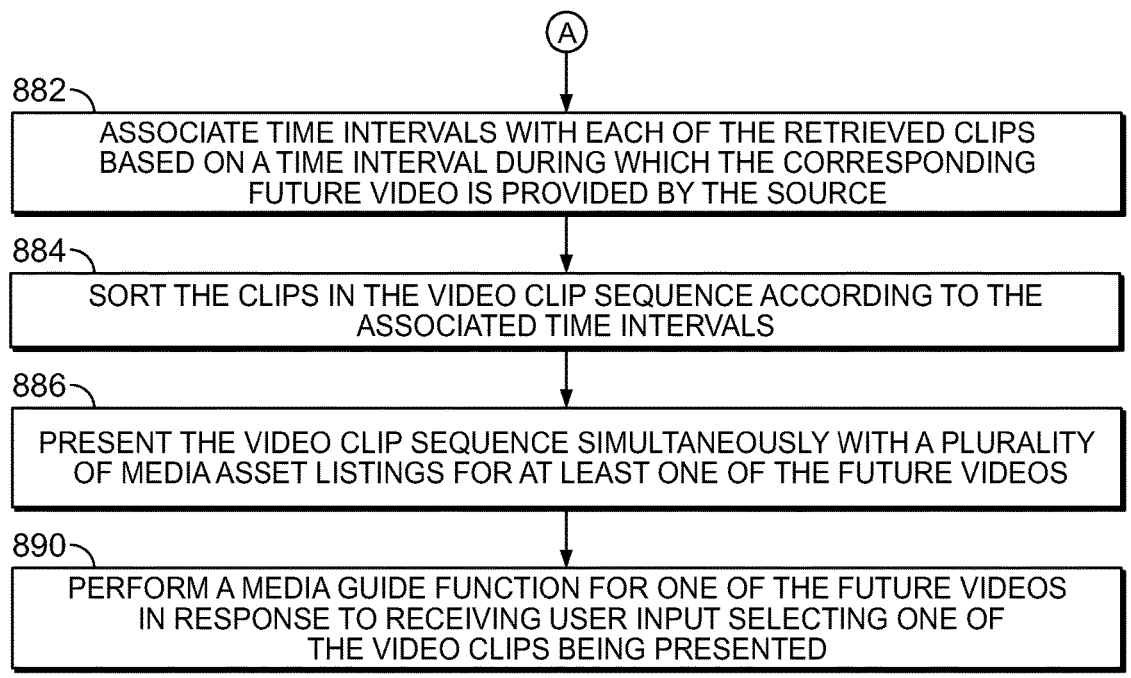

FIG. 8 is a flow diagram of a process 800 for providing a sequence of video clips in the picture-in-guide window of a media guidance application in accordance with some other embodiments of the disclosure. At step 810, a user input that identifies a source of video is received. For example, the media guidance application may receive a user input that identifies a given content source. In some implementations, the input from the user may be a navigation command that navigates a cursor or highlight region to a particular listing (e.g., listing 108) (FIG. 1). In such circumstances, the media guidance application may identify, as the source, a content source associated with a media asset listing (e.g., the content source from which the media asset corresponding to the media asset listing is transmitted). In some implementations, the input from the user may be a navigation command that navigates a cursor or highlight region to a source listed in sources 104 (FIG. 5) and optionally presses a SELECT key.

At step 820, a time is determined based on the received user input. For example, the media guidance application may determine a current time (e.g., 7:05 pm) when the input from the user identified the content source. In some implementations, the media guidance application may determine a scheduled time interval associated with a media asset currently being transmitted by the identified source. The scheduled time interval may include the start and/or end time of the transmission of the media asset from the source. In some implementations, the media guidance application may determine a scheduled time interval associated with a media asset that is identified by the user (e.g., a media asset listing highlighted by the user).

At step 830, a plurality of future videos that is provided by the source after the determined time and before a threshold time is identified. For example, the media guidance application may cross-reference the determined time, a threshold time, and the identified source with a database of scheduled media assets to retrieve a list of future media assets provided by the source after the identified time. The threshold time may be user defined, automatically selected, selected based on a user profile, a default value, a dynamic value, a value that is different depending on the source identified by the user, and/or any combination thereof. Following step 830, the process proceeds to step 840 or optionally to step 850.

In some embodiments, the determined time may correspond to the current time and the threshold time may be a period of three hours following the determined time. In such circumstances, the media guidance application may retrieve a list of media assets that are scheduled for transmission from the identified source after the current time up to three hours later (e.g., the threshold time). If the media asset currently being transmitted is scheduled to be transmitted for another hour, the media asset currently being transmitted may be included in the list of media assets provided by the source after the identified time. For example, the current time may be 7:05 pm and the content source identified may be channel 2, FOX (FIG. 5). Accordingly, the database may be cross-referenced with these parameters and return as the list of media assets the media assets "The Simpsons" (which is scheduled to end transmission at 7:30 pm), "King of the Hill" (which is scheduled to end transmission at 8:00 pm), and "Joe Millionaire" (which is scheduled to end transmission at 10:30 pm). The list does not include media assets that are scheduled for transmission after "Joe Millionaire"

because those media assets are scheduled for transmission after the threshold time (e.g., 10:05 pm, three hours following the current time).

In some embodiments, the determined time may correspond to the scheduled time interval (or ending point of the scheduled time interval) associated with a media asset currently being transmitted and the threshold time may be a period of three hours following the determined time. In such circumstances, the media guidance application may retrieve a list of media assets that are scheduled for transmission from the identified source after the end point of the scheduled time interval of the media asset currently being transmitted up to three hours later (e.g., the threshold time). For example, the end point of the scheduled time interval of the media asset currently being transmitted, "The Simpsons" on channel 2, may be 7:30 pm (e.g., the time when the media asset "The Simpsons" is scheduled to end) and the content source identified may be channel 2, FOX (FIG. 5). Accordingly, the database may be cross-referenced with these parameters and return as the list of media assets the media asset "King of the Hill" (which is scheduled to start transmission at 7:30 pm) and "Joe Millionaire" (which is scheduled to end transmission at 10:30 pm). The list does not include the media asset currently being transmitted by the source or media assets that are scheduled for transmission after "Joe Millionaire" because those media assets are scheduled for transmission before the determined time (e.g., 7:30 pm) and after the threshold time (e.g., 10:30 pm, three hours following the determined time).

In some embodiments, the determined time may correspond to the scheduled time interval scheduled time interval associated with a media asset that is identified by the user and the threshold time may be a period of three hours following the determined time. In such circumstances, the media guidance application may retrieve a list of media assets that are scheduled for transmission from the identified source after the end point of the scheduled time interval associated with a media asset that is identified by the user up to three hours later (e.g., the threshold time). For example, the end point of the scheduled time interval of the media asset that is identified by the user (e.g., "Will & Grace" on channel 4, NBC) may be 8:00 pm (e.g., the time when the media asset "Will & Grace" is scheduled to end) and the content source identified may be channel 4, NBC (FIG. 5). Accordingly, the database may be cross-referenced with these parameters and return as the list of media assets the media assets "ER" (which is scheduled to start transmission at 8:00 pm), "General Hospital" (which is scheduled to start transmission at 9:00 pm) and "Seinfeld" (which is scheduled to end transmission at 11:00 pm). The list does not include media assets scheduled for transmission by the source before the determined time (e.g., the time that precedes an end time of the media asset identified by the user) or media assets that are scheduled for transmission after "Seinfeld" because those media assets are scheduled for transmission before the determined time (e.g., 8:00 pm) and after the threshold time (e.g., 11:00 pm, three hours following the determined time).

At step 840, a profile associated with the user is retrieved. For example, the media guidance application may retrieve a profile of the user from storage 308 (FIG. 3).

At step 850, a next future video is selected from the plurality of videos. For example, the media guidance application may set a pointer to the start of the list of media assets retrieved from the database. The pointer may represent the next future media asset in the list of future media assets. The media guidance application may retrieve an identifier (e.g., a title or unique number) of the future media asset that is pointed to by the pointer (e.g., the next future media asset).

At step 860, a next clip corresponding to the selected future video is retrieved. For example, the media guidance application may cross-reference the identifier of the future media asset with index 600 to retrieve a clip and/or information associated with a clip corresponding to the future media asset. In particular, the media guidance application may cross-reference the identifier of the future media asset (e.g., the title "King of the Hill" or unique number "13597") with index 600. In response, the media guidance application may identify one or more corresponding clips of the media asset (e.g., clip identifier "135976") and/or attributes of those clips (e.g., genre, "Drama"; and length, "0:10" seconds). Following step 860, the process proceeds to step 870 or optionally to step 874.

At step 870, a determination is made as to whether content of the retrieved clip matches the retrieved profile. In response to determining that content of the retrieved clip matches the profile, the process proceeds to step 874, otherwise the process proceeds to step 872. For example, the media guidance application may compare attributes of the retrieved clip to attributes specified in a user profile. In particular, the user profile may indicate that the user prefers comedies and dislikes dramas and prefers clips shorter than 11 seconds. The media guidance application may determine that the clip is of the genre "Drama," which is something that the user dislikes (e.g., the clip attribute does not match the user profile attribute) but is 10 seconds long, which is shorter than 11 seconds (e.g., the clip's length matches the user profile). In some implementations, the media guidance application may perform a mathematical function (e.g., an average or weighted average) of the number of attributes that match and the number of attributes that do not match the user profile. If the result of the mathematical function is above a threshold, the media guidance application may determine that the clip attributes match the user profile even though some of the attributes do not match attributes of the user profile.

At step 872, a determination is made as to whether additional clips are available for the selected future video. In response to determining that additional clips are available, the process proceeds to step 860, otherwise the process proceeds to step 874. For example, in response to determining that the clip attributes does not match the user profile, the media guidance application may attempt to seek out another clip of the selected future media asset that does have attributes that match the user profile. In particular, the media guidance application may cross-reference the media asset identifier with index 600 to determine whether additional clips for the media asset are available. For example, the media guidance application may determine that the media asset identifier (e.g., title "King of the Hill") has two entries in index 600. After processing the first entry and determining that the clip corresponding to the first entry does not match the user profile, the media guidance application may select the second entry (e.g., the clip corresponding to the future media asset that is associated with different attributes than the first clip). Specifically, the second clip of the future media asset may be associated with a "comedy" genre attribute and a "0:12" seconds length attribute. While the first clip of the future media asset may not match the user profile, the second clip of the future media asset may be determined to match the user profile.

At step 874, the retrieved clip is added to the video clip sequence. For example, after identifying a clip in index 600, the media guidance application may add the clip to an entry in data structure 700 corresponding to the identified source. In particular, the media guidance application may add the clip identifier "135976" to the sequence field corresponding to the source identifier "7000, FOX". Each entry in the sequence field of data structure 700 may be placed in a queue. As clips or identifiers are added to the sequence for a given media asset, the media guidance application may append the clip identifier to the queue or prepend the clip identifier to the queue.

At step 880, a determination is made as to whether additional videos remain in the plurality of future videos. In response to determining that additional videos remain, the process proceeds to step 850, otherwise the process proceeds to step 882. For example, the media guidance application may determine whether the pointer in the future media assets list is pointing to the last future media asset in the list or not. If the pointer is pointing to the last media asset in the list, the media guidance application may determine that no additional future media assets remain to be processed. Alternatively, if the pointer is not pointing to the last media asset in the list, the media guidance application may determine that additional future media assets remain to be processed and may increment the pointer to point to the next future media asset in the list.

At step 882, time intervals are associated with each of the retrieved clips based on a time interval during which the corresponding future video is provided by the source. For example, the media guidance application may cross-reference the clip identifier or media asset identifier corresponding to each clip with a database of media asset schedules. The database may return the scheduled time interval associated with each clip. In particular, the database may return the start and end times of the transmission from the source of each media asset associated with the clips in the sequence.

At step 884, the clips in the video clip sequence are sorted according to the associated time intervals. For example, the media guidance application may process the clips in the sequence for each source in data structure 700 with the associated time intervals (FIG. 7). The media guidance application may rearrange or sort the clips in each sequence according to the associated time intervals. For example, the media guidance application may position the clip associated with the earliest time interval first in the queue and the clip associated with the latest time interval last in the queue. Accordingly, when the sequence of media asset clips is presented, the clips are presented according to when the corresponding to media assets are scheduled for transmission. In some implementations, the media guidance application may position the clip associated with the latest time interval first in the queue and the clip associated with the earliest time interval last in the queue. Accordingly, when the sequence of media asset clips is presented, the clips are presented in reverse order from when the corresponding to media assets are scheduled for transmission.

At step 886, the video clip sequence is simultaneously presented with a plurality of media asset listings for at least one of the future videos. For example, the media guidance application may present the sequence for the identified source in PIG video region 122 (FIG. 5). Alternatively, the media guidance application may present the sequence as an overlay on top of media asset listings or in a separate screen (e.g., a second screen device or separate navigation screen of the guide).

At step 890, a media guide function is performed for one of the future videos in response to receiving user input selected for one of the video clips being presented. For example, the user may position a highlight region over the PIG video region 122 in which the clips are being presented. In response to receiving a user selection (e.g., the user pressing a SELECT key) when one of the clips is being presented in the sequence, the media guidance application may perform a function for the corresponding media asset. In particular, the media guidance application may schedule the corresponding media asset for recording. In some embodiments, the user may skip, fast-forward clips or rewind clips in the sequence as they are presented. In some embodiments, the user may request that the sequence be repeated when the last clip is presented. In some embodiments, the sequence of clips may automatically repeat after the last clip in the sequence is presented.

It should be understood that the above steps of the flow diagram of FIG. 8 may be executed or performed in any order or sequence not limited to the order and sequence shown and described in the figure. Some of the steps of the flow diagram of FIG. 8 may be omitted or skipped. For example, dotted lines indicate alternate or optional paths. Also, some of the above steps of the flow diagram of FIG. 8 may be executed or performed substantially simultaneously where appropriate or in parallel to reduce latency and processing times.

The above described embodiments of the present disclosure are presented for purposes of illustration and not of limitation, and the present disclosure is limited only by the claims that follow.

What is claimed is:

1. A method for providing a sequence of video clips, the method comprising:
   receiving a user input identifying a source of video within a media guide grid display;
   responsive to the input:
      determining a time associated with the input, wherein the time is associated with a scheduled transmission time of a video identified by the input; and
      searching a database for a plurality of future videos that are scheduled for transmission to a plurality of users by the source after the determined time, wherein each of the plurality of future videos is unavailable at the time when the input was received;
   retrieving a scheduled transmission time for each of the plurality of future videos that indicates when each respective future video of the plurality of future videos will be transmitted to the plurality of users;
   identifying a first plurality of video clips of one first future video of the plurality of future videos, and a second plurality of video clips of one second future video of the plurality of future videos, wherein the first future video has a first of the scheduled transmission times, and wherein the second future video has a second of the scheduled transmission times;
   selecting, based on preferences of a user, a first video clip of the first plurality of video clips;
   storing in a sequence field of a data structure a first identifier of the first video clip;
   selecting, based on the preferences of the user, a second video clip of the second plurality of video clips;
   determining whether the first scheduled transmission time is earlier than the second scheduled transmission time;
   in response to determining that the first scheduled transmission time is earlier than the second scheduled transmission time, storing a second identifier of the second video clip, in the sequence field of the data structure, at a sequence position that follows the first identifier; and processing the sequence field of the data structure to generate and display a presentation of the video clips in a sequence having an order determined by the sequence positions of the stored first and second identifiers.

2. The method of claim 1, wherein receiving the input comprises navigating to the identifier of the source in a media guide grid display.

3. The method of claim 1, wherein the source includes a broadcast channel.

4. The method of claim 1, wherein the searching comprises:
identifying videos scheduled for transmission during time slots from the source that are future in time relative to the determined time.

5. The method of claim 1, wherein the time associated with the input is the current time or a scheduled transmission time of a video identified by the input.

6. The method of claim 1, wherein the query parameters include a profile associated with the user.

7. The method of claim 1, further comprising generating a simultaneous presentation of the sequence of video clips and media asset listings associated with the plurality of future videos.

8. The method of claim 1, further comprising:
receiving further input relative to one of the video clips being presented; and
performing a media guide function for the future video corresponding to the one of the video clips being presented in response to receiving the further input.

9. The method of claim 1, further comprising selecting a number of identifiers to include in the sequence field of the data structure based on a predetermined value that is less than a total number of the plurality of future videos.

10. The method of claim 1, wherein displaying the presentation of the video clips in the sequence comprises replacing display of the media guide grid display with display of the presentation of the video clips in the sequence.

11. A system for providing a sequence of video clips, the system comprising:
user input interface circuitry configured to receive a user input identifying a source of video within a media guide grid display; and
control circuitry configured to:
responsive to receiving a command from the user input interface circuitry indicating the input:
determine a time associated with the input, wherein the time is associated with a scheduled transmission time of a video identified by the input; and
search a database for a plurality of future videos that are scheduled for transmission to a plurality of users by the source after the determined time, wherein each of the plurality of future videos is unavailable at the time when the input was received;
retrieve a scheduled transmission time for each of the plurality of future videos that indicates when each respective future video of the plurality of future videos will be transmitted to the plurality of users;
identify a first plurality of video clips of one first future video of the plurality of future videos, and a second plurality of video clips of one second future video of the plurality of future videos, wherein the first future video has a first of the scheduled transmission times, and wherein the second future video has a second of the scheduled transmission times;
select, based on preferences of a user, a first video clip of the first plurality of video clips;
store in a sequence field of a data structure a first identifier of the first video clip;
select, based on the preferences of the user, a second video clip of the second plurality of video clips;
determine whether the first scheduled transmission time is earlier than the second scheduled transmission time;
in response to determining that the first scheduled transmission time is earlier than the second scheduled transmission time, storing a second identifier of the second video clip, in the sequence field of the data structure, at a sequence position that follows the first identifier; and
process the sequence field of the data structure to generate and display a presentation of the video clips in a sequence having an order determined by the sequence positions of the stored first and second identifiers.

12. The system of claim 11, wherein the control circuitry configured to receive the command is further configured to navigate to the identifier of the source in a media guide grid display.

13. The system of claim 11, wherein the source includes a broadcast channel.

14. The system of claim 11, wherein the control circuitry configured to search is further configured to:
identify videos scheduled for transmission during time slots from the source that are future in time relative to the determined time.

15. The system of claim 11, wherein the time associated with the input is the current time or a scheduled transmission time of a video identified by the input.

16. The system of claim 11, wherein the query parameters include a profile associated with the user.

17. The system of claim 11, wherein the control circuitry is further configured to generate a simultaneous presentation of the sequence of video clips and media asset listings associated with the plurality of future videos.

18. The system of claim 11, wherein the control circuitry is further configured to:
receive a further command from the user input interface circuitry indicating further input relative to one of the video clips being presented; and
perform a media guide function for the future video corresponding to the one of the video clips being presented in response to receiving the further input.

19. The system of claim 11, wherein the control circuitry is further configured to select a number of identifiers to include in the sequence based on a predetermined value that is less than a total number of the plurality of future videos.

20. The system of claim 19, wherein the control circuitry is further configured to display the presentation of the video clips in the sequence comprises by replacing display of the media guide grid display with display of the presentation of the video clips in the sequence.

* * * * *